(12) United States Patent
Stegmair

(10) Patent No.: US 7,686,050 B2
(45) Date of Patent: Mar. 30, 2010

(54) DEVICE FOR THE DETACHABLE FITTING OF A TRACTION AID TO VEHICLE WHEELS COMPRISING A RIM AND A TIRE WITH RUNNING SURFACES

(76) Inventor: Michael Stegmair, Hirschtränk 13, Aichach-Untermauerbach (DE) D-86551

( * ) Notice: Subject to any disclaimer, the term of this patent is extended or adjusted under 35 U.S.C. 154(b) by 727 days.

(21) Appl. No.: 11/547,737

(22) PCT Filed: Apr. 6, 2004

(86) PCT No.: PCT/EP2004/003634

§ 371 (c)(1),
(2), (4) Date: Nov. 2, 2006

(87) PCT Pub. No.: WO2005/108125

PCT Pub. Date: Nov. 17, 2005

(65) Prior Publication Data

US 2009/0039698 A1    Feb. 12, 2009

(51) Int. Cl.
*B60B 15/00*    (2006.01)
*B60C 27/06*    (2006.01)
*B60C 27/10*    (2006.01)

(52) U.S. Cl. ................. 152/236; 152/217; 152/232; 301/44.3; 301/42

(58) Field of Classification Search ............. 301/41.1, 301/42, 43, 44.1, 44.3, 44.4; 152/167, 170, 152/171, 173, 174, 178, 179, 180, 181, 208, 152/217, 218, 222, 223, 225 C, 225 R, 226, 152/227, 228, 231, 232, 233, 236, 237; 24/70 CT, 24/70 TT
See application file for complete search history.

(56) References Cited

U.S. PATENT DOCUMENTS 1,348,168 A * 8/1920 Gray ......................... 152/228
1,441,198 A   1/1923 Abbot et al.
1,502,878 A * 7/1924 Rejcek ...................... 152/237
1,540,576 A * 6/1925 Stoural ..................... 152/227
1,665,478 A   4/1928 Scholz
1,963,631 A * 6/1934 Round et al. .............. 152/237
2,501,784 A * 3/1950 Morgan .................... 152/237
2,750,981 A   6/1956 Hoffman
2,879,822 A * 3/1959 Seip et al. ................. 152/237
3,854,514 A * 12/1974 Edwards ................... 152/233
4,271,888 A * 6/1981 Robinson .................. 152/234

FOREIGN PATENT DOCUMENTS

| DE | 829 093 | 1/1952 |
|---|---|---|
| DE | 2 219 730 | 11/1972 |
| DE | 37 15 264 A1 | 11/1988 |
| WO | WO 96/34773 | 11/1996 |

* cited by examiner

*Primary Examiner*—S. Joseph Morano
*Assistant Examiner*—Kip T Kotter
(74) *Attorney, Agent, or Firm*—Laurence A. Greenberg; Werner H. Stemer; Ralph E. Locher

(57) ABSTRACT

A device has a detachably fitting traction aid to be attached using at least two fixing devices, applied to the inner circumferential surface of a rim, in the vicinity of the rim edge, disposed opposing each other, substantially vertically on the plane of the rim and aligned with each other. A first fixing device, faces the wheel inner side, and has a first fixing element for the hooking and unhooking to a second fixing element, complementary to the first fixing element, mounted on one end of the traction aid. The second fixing device, faces the wheel outer side, and has a second fixing element being a coupling device, for coupling and tensioning a tension element, mounted on the other end of the traction aid, such that the traction aid may be tensioned transversely across the tire on the running surface, between both fixing devices.

12 Claims, 6 Drawing Sheets

DEVICE FOR THE DETACHABLE FITTING OF A TRACTION AID TO VEHICLE WHEELS COMPRISING A RIM AND A TIRE WITH RUNNING SURFACES

BACKGROUND OF THE INVENTION

Field of the Invention

The invention relates to a device for the detachable fitting of a traction aid to vehicle wheels comprising a rim and a tire with running surfaces.

Traction aids of this kind are known, for example, as snow chains that form a type of extended chain net and that are usually fitted by first laying the chain net lengthwise in the direction of travel of the tire to be fitted with such a snow chain, subsequently moving the tire over the chain net and then laying both ends of the chain net around the tire and tensioning them together. Re-tensioning takes place after driving a short distance, with said re-tensioning being repeated after further short distances until the snow chain is under sufficient tension.

Fitting a snow chain becomes more difficult when the vehicle in question is already trapped in snow. It is then recommended that the snow chain be placed on the top of the tire and the vehicle wheel rotated until the part that was initially on the top is under the tire. The remainder of the snow chain is then laid around the tire and the chain is tensioned for the first time, with the procedure detailed above then being repeated.

SUMMARY OF THE INVENTION

The object of the invention is to provide a device of the named type that enables the traction aid to be fitted in a simpler and less complicated manner, even when the drive tires are spinning on slippery ground, whether snow or sand or the like and the vehicle in question has become trapped.

The object is achieved according to the invention, in the case of a device of the type mentioned in the introduction, by means of at least two fixing devices applied to the inner circumferential surface of the rim, in each case in the vicinity of the rim edges, arranged opposite each other essentially perpendicular to the plane of the rim and aligned with each other to form a pair, and of which the first fixing device facing the wheel inner side, having a first fixing element, serves for the hooking and unhooking of a second fixing element, complementary to said first fixing element, mounted on one end of the traction aid, while the second fixing device facing the wheel outer side is provided with a second fixing element in the form of a coupling device for the coupling and tensioning of a tension element mounted on the other end of the traction aid, such that the traction aid may be tensioned transversely across the tire on the running surface between the two fixing devices.

This arrangement of the device in accordance with the invention enables a traction aid to be clamped to a top and, thus exposed, part of the running surface of the vehicle wheel, i.e. in a freely accessible area thereof, which traction aid merely covers a part of the complete running surface of the tire of the vehicle wheel. This on its own may be sufficient to provide adequate ground traction to the drive wheel in question to help the correspondingly equipped vehicle to move away from a difficult ground area.

A plurality of pairs of fixing devices can, however, be advantageously evenly distributed around the inner circumferential surface of the rim in such a way that, for example, two further pairs of fixing elements to which two further traction aids can be clamped could be present to the right and left of the first pair.

If five such pairs of fixing elements corresponding to a preferred embodiment of the invention are distributed around the inner circumferential surface of the rim of the vehicle wheel in the manner described, then all that is required is for the driven vehicle wheel to be rotated by approximately 180° in order to also be able to secure the remaining two traction aids to the remaining two pairs of fixing devices, thus providing uniform traction distribution around the circumference of the wheel. It is clear that the number of pairs of fixing devices distributed around the inner circumference can be either fewer or more than five, for example depending upon the diameter of the rim, so that for a larger rim diameter a larger number of pairs is fitted and thus a corresponding number of traction aids can be fitted. On the other hand it is not imperative that all the pairs of fixing devices present be provided with traction aids when used, because it may be, as already indicated above, that just one, two or three traction aids are sufficient to provide the vehicle wheel in question with adequate ground friction and ensure adequate propulsion for the vehicle in question.

According to a preferred embodiment, at least one fixing bridge fixed on the inner circumferential surface of the rim transverse to the plane of the rim and extending essentially over the width of same is provided, on both ends of which the fixing devices forming a pair are arranged. The fitting of a fixing bridge of this kind, that has the fixing devices on its ends, on a rim is particularly suitable when the rim disk of said rim has openings to the circumferential surface of the rim or is provided with spokes, that are naturally spaced apart from each other at the point of transition to the inner circumferential surface of the rim. An advantageous arrangement can then be achieved so that the particular fixing bridge extends through such an opening or between two spokes.

Welding can usefully be used as the method of fixing but it is also possible to bolt the fixing bridge or bridges to the inner circumference of the rim so that the fixing bridges can even be detachable. For example, this would mean that the fixing bridges would not always have to be carried on the wheels but instead said bridges could be fitted at the start of the cold season, particularly in the case of passenger cars where fixing bridges would be regarded as visually intrusive. This point is, of course, less important on commercial vehicles, particularly trucks. Apart from this the fixing bridges can generally if necessary be completely covered by wheel trim.

As already stated, a separate traction aid is assigned to the pair of fixing devices of each fixing bridge. For this purpose, it is useful if the first fixing element on the first fixing device of the fixing bridge is an eye and the second fixing element complementary thereto on the one end of the traction aid is a hook that can be hooked into the eye. This guarantees a simple fitting of the traction aid to the wheel inner side.

Advantageously, the tension element is fitted to the other end of the traction aid by means of a first pivot pin that passes on the one hand through the tension element and on the other hand through a fitting fitted to the other end of the traction aid.

The fitting usefully consists of a chain link that engages with the traction aid, on both sides of which two straps are welded in parallel by means of the mutually opposite surfaces of their respective first ends, while the other ends of the straps hold between them the tension element and the first pivot pin which passes through corresponding first holes in the straps on the one hand and the tension element on the other hand and can be split pinned.

According to a preferred embodiment, the fixing bridge can be embodied as a double web with two part-webs arranged at a distance from each other and parallel to each other, thus increasing its stability and simplifying the coupling of the tension element.

The tension element is advantageously a tension lever, the thickness of which is less than the distance between the part-webs and which can be inserted between the two part-webs. The tension lever can furthermore be coupled to the part-webs by means of a second pivot pin, at a distance from the first pivot pin transverse to the direction of tensioning and to the inner circumferential surface, which second pivot pin is inserted into aligned second holes in the end of the tension lever facing towards the other end of the traction aid on the one hand and in both part-webs on the other hand and can be split pinned. Due to the fact that there is a distance between the first and second pivot pins, the first pin is eccentric with respect to the second pivot pin so that swiveling the tension lever toward the rim tensions the traction aid that is hooked into the other side of the rim and laid over the running surface.

In this way, the other end of the traction aid can be quickly and easily fixed and tensioned on the second fixing element of the fixing bridge or double web.

The tension lever can advantageously be releasably locked by tensioning the traction aid against the fixing web by means of a re-releasable locking pin that can be inserted into third holes aligned with each other, at a distance from the second pivot pin in the longitudinal direction of the tension lever, in the area of the tension lever facing away from the other end of the traction aid on the one hand, and into the double web on the other hand, and can be split pinned.

Moreover, a plurality of third holes on a circle of rotation of the tension lever around the second pivot pin and at the stated distance from same, arranged in the direction of rotation at a distance from each other and aligned with each other, are usefully provided to accept a locking pin in the double web in such a way that the tension lever can be locked in different tensioned positions.

Moreover, it is advantageous if at least two holes for the locking pin are provided in the tension lever on the same circle of rotation about the second pivot pin, with the distance between in each case two of these holes in the tension lever being greater than the distance between in each case two holes aligned with each other in the double web.

Each traction aid preferably consists of a chain sling held apart by two bar-type spreaders arranged in the circumferential direction of the tire at both sides on the edges of same in such a manner that in each case two chain sling sections are tensioned over the running surface of the tire and spaced apart from each other at a distance corresponding to the length of the spreaders.

The invention is explained in more detail in the following with the aid of the preferred exemplary embodiment shown in the drawing.

DESCRIPTION OF THE PREFERRED EMBODIMENTS

Figure 1:
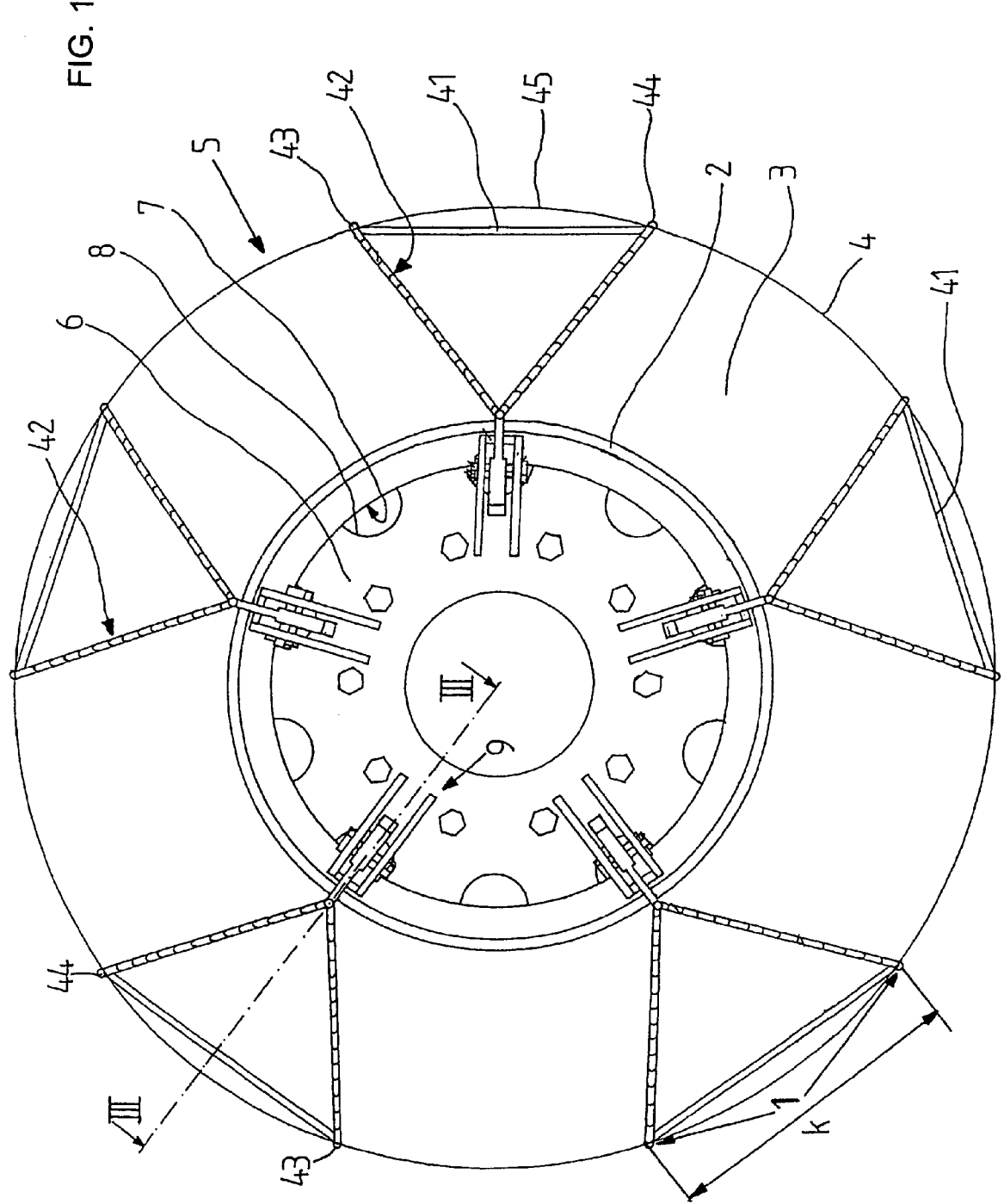
FIG. 1 shows a plan view on the outside of a vehicle wheel fitted with five devices according to the invention.
Figure 2:
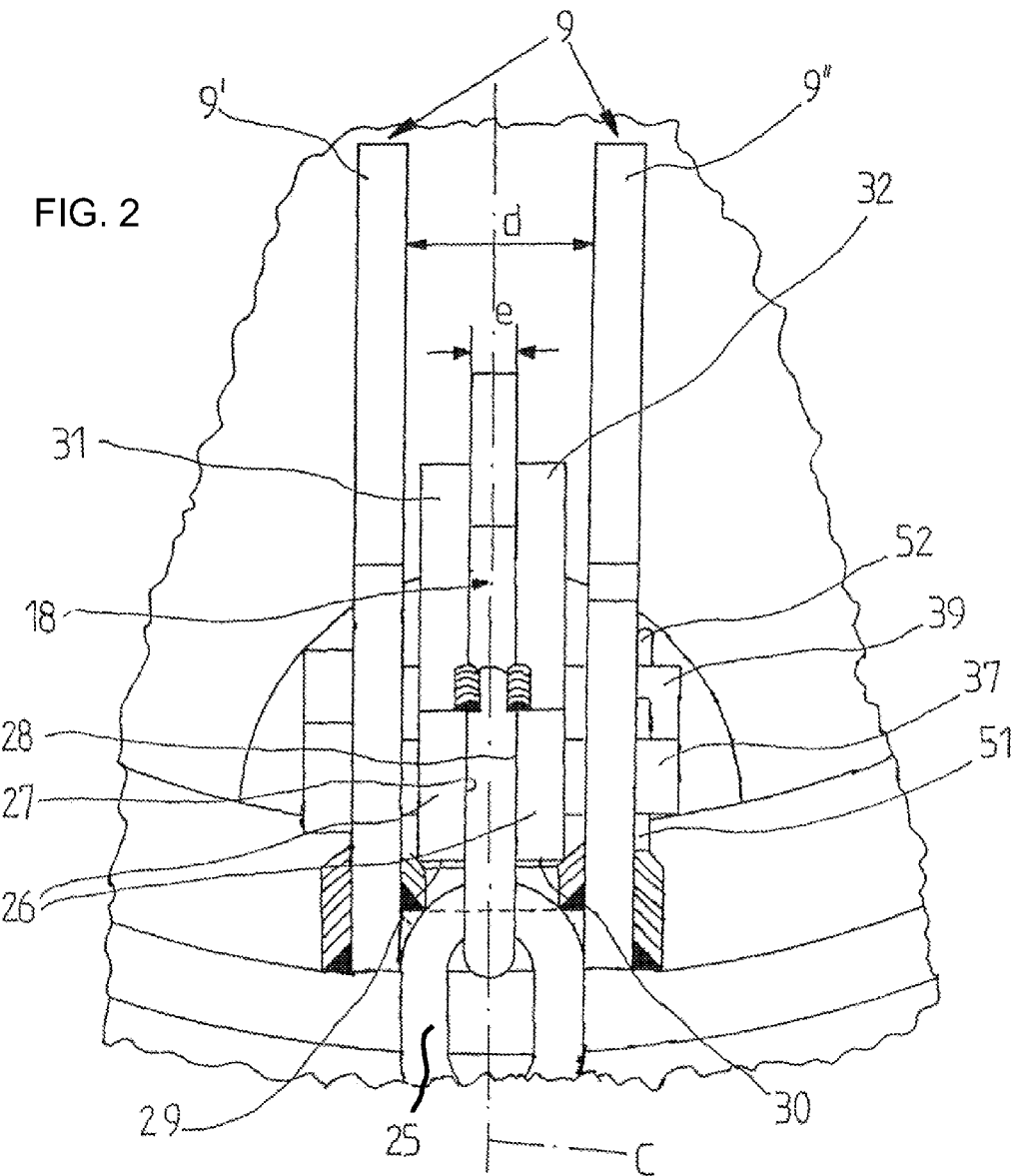
FIG. 2 shows a detail from a plan view, corresponding to FIG. 1, showing an enlarged view of a double web with a tension lever and having a pair of fixing devices.

The figures show a preferred embodiment of a device according to the invention for the detachable fitting of a traction aid 1 to a vehicle wheel 5 comprising a rim 2 and a tire 3 with running surface 4. The rim 2 has a rim disk 6 with openings 8 through to the inner circumferential surface 7 of the rim 2.

With the embodiment shown, the rim disk 6 has ten such openings 8.

Figure 4:
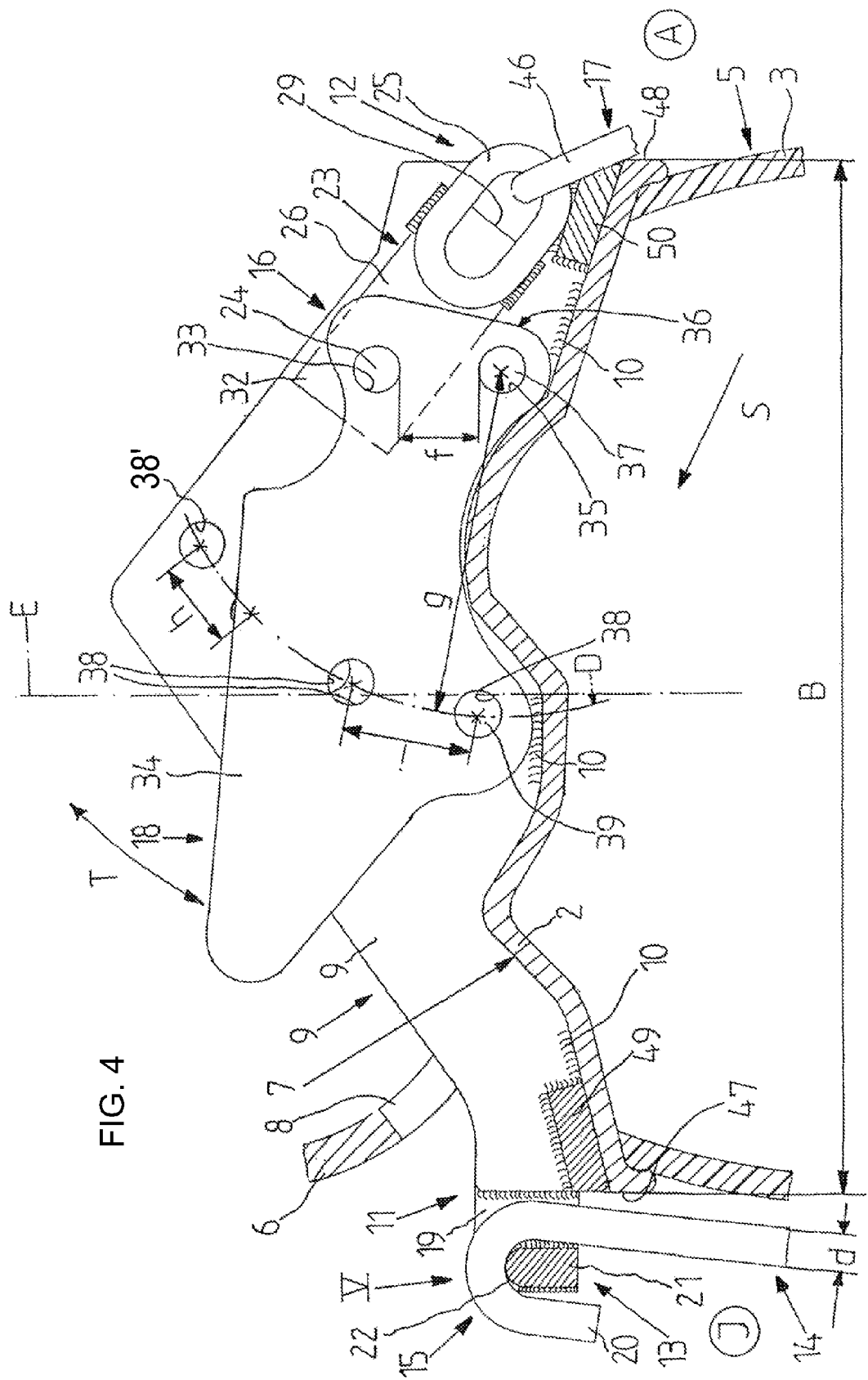
FIG. 4 shows an enlarged detail from FIG. 3.

According to the invention at least one fixing bridge 9 is provided, which is fixed to the inner circumferential surface 7 of the rim 2 transverse to the plane of the rim (that runs parallel to the plane of the drawing) and extends essentially over its width B (FIG. 4). In this case, said fixing bridge 9 is fixed as a double web to the inner circumferential surface 7 of the rim 2 by means of welds 10.

The double web 9 has in each case a pair formed from a first and second fixing device 11 and 12 respectively. The first fixing device 11 facing the wheel inner side I of the double web 9 is provided with a first fixing element 13 for hooking and unhooking a second fixing element 15 complementary to the first fixing element 13 and fitted to the one end 14 of the traction aid 1.

Furthermore, the second fixing device 12 of the double web 9 facing the wheel outer side A is provided with a coupling device 16 for coupling and tensioning a tension element 18 fitted to the other end 17 of the traction aid 1, such that the traction aid 1 may be tensioned transversely across the tire 3 on the running surface 4 between both ends 11 and 12 of the fixing web 9.

As can be seen in FIGS. 1 to 4, the double web 9 in each case extends through an opening 8. As can be seen, a plurality of double webs 9 evenly distributed around the inner circumferential surface 7 extend through correspondingly distributed openings 8, with the illustrated embodiment having five double webs 9 of this kind. Because there are ten openings 8 present, a double web 9 thus extends through every second opening 8.

According to the invention, it can now be seen that a separate traction aid 1 is assigned to each double web 9.

With the embodiment shown, the first fixing element 13 on the first fixing device 11 of the double web 9 is an eye 19 and the second fixing element 15 complementary thereto on the one end 14 of the traction aid 1 is a hook 20 that can be hooked into the eye 19.

Figure 5:
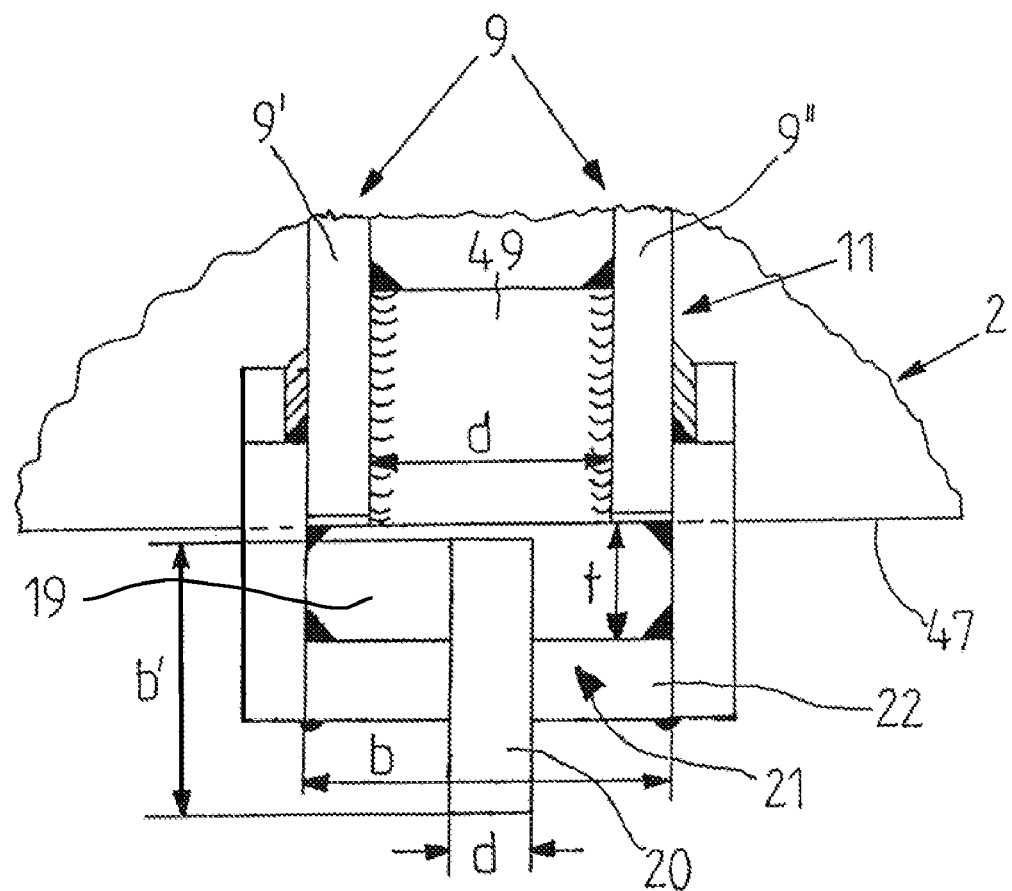
FIG. 5 shows a detail from FIG. 4 in the direction of arrow V.

As is clearly shown in FIGS. 4 and 5, in this case it is advantageous if the eye 19 is embodied in such a way that its depth t arranged perpendicular to the plane of the wheel (that corresponds to the center plane E in FIG. 4) is greater than the diameter d of the rod material of the hook 20, but its width b is somewhat greater than the width b' of the curved part of the hook 20 (FIG. 5). The result of this is that the hook 20 can only be inserted into the eye 19 from below when rotated 90° relative to its position shown in FIGS. 4 and 5 (FIG. 4) and can then be hooked onto a cross bar 21 of the eye 19 after turning back, with this cross bar 21 being suitably rounded on its top 22 corresponding to the curve in the hook (FIG. 4). This provides for a reliable anchorage of the hook 20 in the eye 19 without the danger of a strong deflection of the tire 3, for example if the air pressure is too low, resulting in an automatic disengagement of the hook 20 from the eye 19.

The tension element 18 is secured at the other end 17 of the traction aid by means of a first pivot pin 24 that passes through the tension element 18 on the one hand and a fitting 23 fixed to the other end 17 of the traction aid 1 on the other hand.

Moreover, the fitting 23 advantageously consists of a chain link 25 that engages with the traction aid 1, on both sides of which two straps 26 are welded in parallel by means of the mutually opposite surfaces 27 and 28 of their respective first ends 29 and 30. The other ends 31 and 32 of the straps 26 hold between them the tension element 18 and first pivot pin 24 which passes through corresponding first holes 33 in the straps 26 on the one hand and the tension element 18 on the other hand and is locked by a split pin.

With the preferred embodiment shown, the double web has two part-webs 9' and 9" arranged at the distance d from each other (FIG. 2) and parallel to each other. To guarantee the required distance between the part-webs 9' and 9", spreaders 49 and 50 are welded to the two respective ends 11 and 12 of the double web 9. These spreaders also protect the respective rim edges 47 and 48 from the hook 20 on the one hand and the chain links 25 and 46 adjacent to the fitting 23 on the other hand.

The tension element 18 is usefully a tension lever 34 the thickness e of which is less than the distance d between the part-webs 9' and 9" and that can be inserted between the two part-webs 9' and 9".

Furthermore, the tension lever 34 can be coupled to the part-webs 9' and 9" by means of a second pivot pin 37, offset at a distance (f) from the first pivot pin 24 transverse to the direction of tensioning S and to the inner circumferential surface 7, which second pivot pin 37 is inserted in second holes 35 (FIG. 4) aligned with each other in the end 36 of the tension lever 34 facing towards the other end 17 of the traction aid 1, on the one hand and in both part-webs 9 and 9' on the other hand and can be split pinned (split pin 51), in such a manner that due to the distance f between them an eccentricity of the first pivot pin 24 exists with respect to the second pivot pin 37 and swiveling the tension lever 34 in the direction of the arrow T, and thus in the direction of the rim, tensions the traction aid 1.

It is necessary that after swiveling in the direction of the arrow T and thus tensioning the traction aid 1 (FIG. 4) the tension lever 34 is locked against the rim or double web 9 or the two part-webs 9', 9", to maintain the tension of the traction aid 1.

For this purpose, the tension lever 34 can advantageously be releasably locked by tensioning the traction aid against the part-webs 9', 9" by means of a releasable locking pin 39 that can be inserted into third holes 38 aligned with each other, at a distance g from the second pivot pin 37 in the longitudinal direction of the tension lever (see longitudinal axis c in FIG. 2), in the area of the tension lever 34 facing away from the other end 17 of the traction aid 1 on the one hand and into the two part-webs 9', 9" on the other hand and can be split pinned (split pin 52).

Furthermore, a plurality of third holes 38, 38' on a circle of rotation of the tension lever 34 around the second pivot pin 37 and at a distance (radius g) from same, arranged in the direction of rotation (arrow T) at a distance h from each other and aligned with each other are provided to accept the locking pin 39 in such a way that the tension lever 34 can be locked in different tensioned positions. This enables tolerances, for example in tire sizes or in the length of the traction aid 1, etc., to be accommodated.

Furthermore, at least two holes 38 for the locking pin 39 can also be provided in the tension lever 34 on the same circle of rotation D about the second pivot pin 37, with the distance i between in each case two holes 38 in the tension lever 34 being greater than the distance h between in each case two holes 38 in the part-webs 9' and 9", thus facilitating adjustments.

Figure 3:
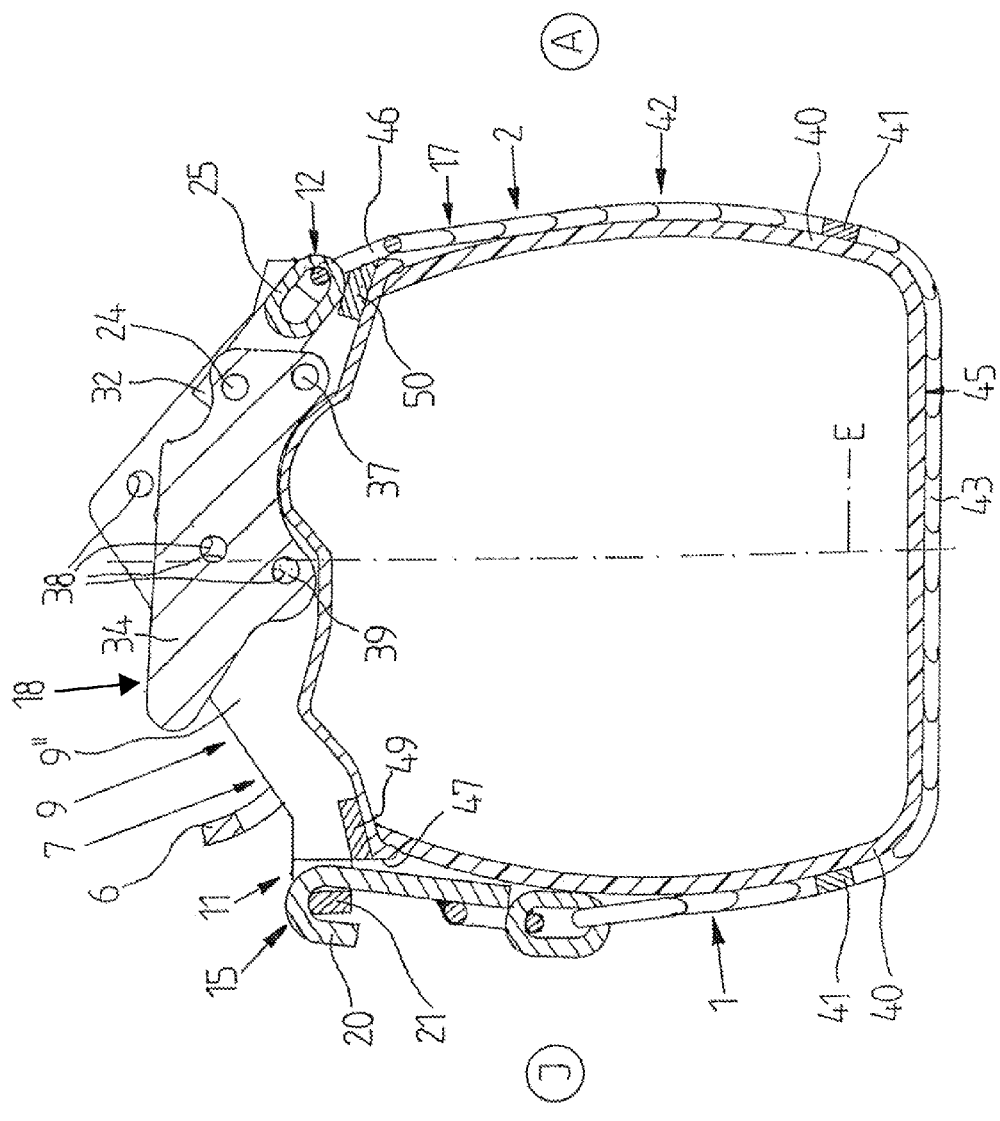
FIG. 3 shows a section along line III-III in FIG. 1.
Figure 6:
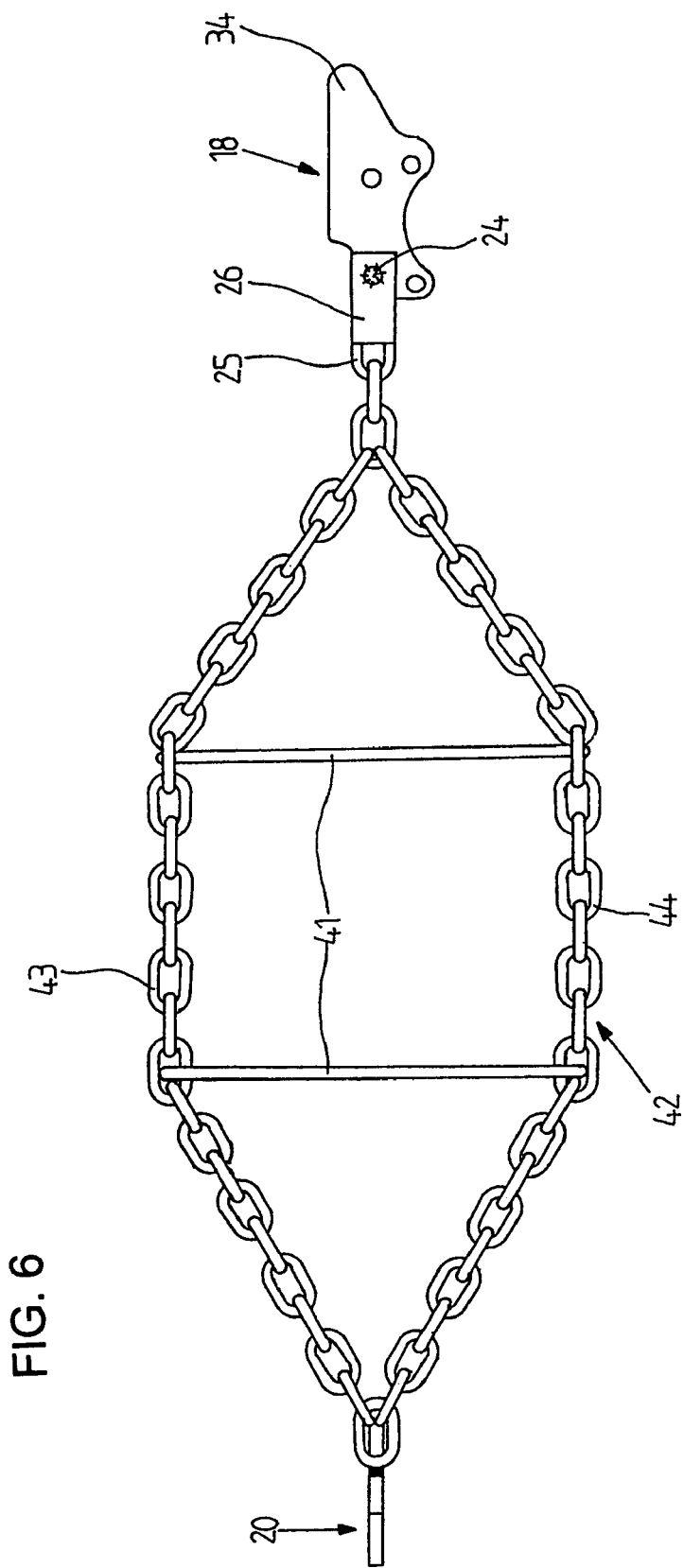
FIG. 6 shows a plan view of a traction aid.

With the preferred embodiment shown, each traction aid 1 according to FIGS. 1, 3 and 6 consists of a chain sling 42 held apart by two bar-type spreaders 41 arranged in the circumferential direction of the tire 3 at both sides on the edges 40 of same in such a manner that in each case two chain sling sections 43 and 44 are tensioned over the running surface 45 of the tire 3 and spaced apart from each other at a distance k corresponding to the length of the spreaders 41.

It is of course obvious that the snow chain does not necessarily have to be a type of chain net in the manner described, but can also be a simple chain tensioned transversely over the running surface of the tire, especially where the ground traction is not so bad that the use of a chain net with a corresponding plurality of links appears necessary to generate greater adhesion or friction. Just one or more single chains could perhaps also be sufficient to get the vehicle thus equipped back in operation.

I claim:

1. A device for detachably fitting to a vehicle wheel having a rim with an inner circumferential surface and a tire with a running surface, the device comprising:
    a traction aid having a first end and a second end;
    a tension element mounted on said first end of said traction aid; a fitting fitted to said first end of said traction aid; said tension element having a first pivot pin for fitting said tension element to said first end of said traction aid, said first pivot pin passing through said tension element and through said fitting fitted to said first end of said traction aid;
    at least two fixing devices fixed to the inner circumferential surface of the rim in each case in a region of rim edges, disposed opposite to each other and substantially perpendicular to a plane of the rim and aligned with each other to form a pair, said two fixing devices including:
        a first fixing device facing the inner circumferential surface of the rim and having a first fixing element and a second fixing element being complementary to said first fixing element, said first fixing element hooking and unhooking to said second fixing element, said first fixing device mounted on said second end of said traction aid; and
        a second fixing device facing a wheel outer side and having a coupling device for coupling and tensioning of said tension element, such that said traction aid may be tensioned transversely across the tire on the running surface between said first and second fixing devices; and
    at least one fixing bridge fixed on the inner circumferential surface of the rim transverse to the plane of the rim and extending substantially over a width of the rim, said fixing bridge having ends on which said first and second fixing devices are disposed, said fixing bridge being a double web with two part-webs disposed at a first distance from each other and parallel to each other.

2. The device according to claim 1, wherein the rim has a rim disk with openings formed therein and extending into the inner circumferential surface of the rim, said fixing bridge extending through one of the openings.

3. The device according to claim 2, wherein said at least one fixing bridge is one of a plurality of fixing bridges evenly distributed around the inner circumferential surface and each extend through one of the openings.

4. The device according to claim 3, wherein said plurality of fixing bridges is five fixing bridges.

5. The device according to claim 3, wherein said traction aid is one of a plurality of traction aids with one of said traction aids assigned to each of said fixing bridges.

6. The device according to claim 1, wherein:
said first fixing element is disposed on a first of said ends of said fixing bridge and is an eye; and
said second fixing element is disposed on said second end of said traction aid and is a hook for hooking into said eye.

7. The device according to claim 1, wherein:
said fitting contains:
a chain link engaging said traction aid; and
two straps having first ends, second ends, mutually opposite surfaces and first holes formed therein, said straps disposed on both sides of said chain link welded in parallel by said mutually opposite surfaces at said first ends, said second ends of said straps holding between them said tension element, and said first pivot pin passing through corresponding said first holes in said straps and said tension element.

8. The device according to claim 7, wherein said tension element is a tension lever having a thickness being less than said first distance between said part-webs and being disposed between said two part-webs, said tension lever having second holes formed therein and a second pivot pin for coupling to said part-webs, said second pivot pin disposed offset at a second distance from said first pivot pin transverse to a direction of tensioning and to the inner circumferential surface, said second pivot pin disposed in said second holes aligned with each other in an end of said tension lever facing towards said first end of said traction aid and in both said part-webs, in such a manner that due to the second distance an eccentricity of said first pivot pin exists with respect to said second pivot pin and swivelling said tension lever toward the rim in a given direction of rotation tensions said traction aid.

9. The device according claim 8, further comprising a releasable locking pin;
wherein said tension lever and said part-webs having third holes formed therein; and
wherein said tension lever being releasably locked by tensioning said traction aid against said part-webs by said releasable locking pin being inserted into said third holes aligned with each other, at a third distance from said second pivot pin in a longitudinal direction of said tension lever, in an area of said tension lever facing away from said first end of said traction aid and also into said two part-webs.

10. The device according to claim 9, wherein said third holes disposed along a circle of rotation of said tension lever around said second pivot pin and at said third distance from said second pivot pin, said third holes further disposed in the given direction of rotation at a fourth distance from each other and aligned with each other and provided to accept said releasable locking pin such that said tension lever can be locked in different tensioned positions.

11. The device according to claim 10, wherein at least two said third holes for said releasable locking pin are formed in said tension lever on said circle of rotation around said second pivot pin, with a fifth distance between in each case two said third holes in said tension lever being greater than the fourth distance between in each case two said third holes in said part-webs.

12. The device according to claim 1, wherein said traction aid has two bar-type spreaders and a chain sling with two chain sling sections, said chain sling is held apart by said two bar-type spreaders disposed in a circumferential direction of the tire at both sides on edges of the tire such that in each case said two chain sling sections are tensioned over the running surface of the tire and spaced apart from each other at a distance corresponding to a length of said bar-type spreaders.

* * * * *